United States Patent [19]

Buma et al.

[11] Patent Number: 4,834,418

[45] Date of Patent: May 30, 1989

[54] ELECTRONIC CONTROLLED GAS SUSPENSION SYSTEM

[75] Inventors: Shuuichi Buma; Nobutaka Ohwa, both of Toyota; Osamu Takeda, Susono; Toshio Aburaya, Toyota, all of Japan

[73] Assignee: Toyota Jidosha Kabushiki Kaisha, Japan

[21] Appl. No.: 180,115

[22] Filed: Apr. 11, 1988

[30] Foreign Application Priority Data

Apr. 20, 1987 [JP] Japan .............................. 62-59478[U]

[51] Int. Cl.⁴ .............................................. B60G 11/26
[52] U.S. Cl. .................................... 280/707; 280/711
[58] Field of Search ............... 280/707, 708, 704, 711; 364/550, 424

[56] References Cited

U.S. PATENT DOCUMENTS

| 4,651,290 | 3/1987 | Masaki et al. | 280/707 |
| 4,659,104 | 4/1987 | Tanaka et al. | 280/707 |
| 4,666,180 | 5/1987 | Shirakuma | 280/707 |

FOREIGN PATENT DOCUMENTS 50-28589  9/1975  Japan.
58-112607 8/1983  Japan.

Primary Examiner—Richard A. Bertsch
Attorney, Agent, or Firm—Oliff & Berridge

[57] ABSTRACT

An electronic controlled gas suspension system for realizing rapid control of the vehicle attitude and uniform actions of air springs. In this suspension system, gas states in plural reserve tanks are detected by gas state detection means to energize/deenergize communication means for communicating/discommunicating the reserve tanks one another when a pressure difference among the reserve tanks is determined to attain a predetermined value, so that the air states in the plural pressure tanks can be controlled to be equal.

4 Claims, 15 Drawing Sheets

ELECTRONIC CONTROLLED GAS SUSPENSION SYSTEM

BACKGROUND OF THE INVENTION

1. Field of the Invention

This invention relates to an electronic controlled gas suspension system for controlling vehicle attitude, having plural reserve tanks to be used for equalizing the action of air springs in effecting a same function against the gas suspensions.

2. Prior art

Gas suspensions have been popularly used for controlling vehicle attitude. In order to supply compressed gas to the gas springs, various systems have been proposed. For example, in an electronic controlled air suspension system disclosed in Japan published examined patent application No. 50-28589, high-pressure air compressed by a compressor is temporarily stored in a high-pressure reserve tank and the air consumed in the air spring is also stored in a low-pressure reserve tank to be used as an intake air of the compressor, so that a closed air circuit is constructed to keep the air free from dust and moisture. Another art is disclosed in Japan published unexamined utility model application No. 58-112607. In this art, high-pressure air compressed by a compressor is temporarily stored in a high-pressure reserve tank, and it is rapidly supplied to the air springs in accordance with a predetermined condition so as to improve riding comfort of a vehicle.

Those prior art electronic controlled air suspension systems, however, include some shortcomings. In those systems, each air spring of each wheel is respectively connected with a reserve tank to actuate the air springs. Since the air springs are distant from the reserve tank, the working speed of the air springs may be lowered or the action of their springs may be disordered.

SUMMARY OF THE INVENTION

It is an object of the present invention to provide an electronic controlled gas suspension system for realizing rapid control of the vehicle attitude and for equalizing the action of the air springs in effecting a same function against the gas suspensions.

To achieve this and other objects, the present invention employs such constitution set forth. Namely, the electronic controlled gas suspension system having a plurality of gas suspensions M2 each provided for a wheel M1 of a vehicle includes: a plurality of reserve tanks M3 each communicably connected to at least one of the gas suspensions M2 and all provided for effecting a same function against the gas suspensions M2; a communication means M4 for making a communication among the plurality of reserve tanks M3 effecting the same function; a plurality of gas state detection means M5 each provided for each of the plurality of reserve tanks M3 for detecting a gas state of each of the plurality of reserve tanks M3; and communication control means M6 for effecting the communication means M4 to make a communication among the plurality of reserve tanks M3 effecting the same function when a difference among the detected gas state of the plurality of reserve tanks effecting the same function becomes a predetermined state. Here, "effecting a (the) same function (against the gas suspensions M2)" means either "supplying gas (to the gas suspensions M2)" or "receiving gas (from the gas suspensions M2)". As the gas states of the plural reserve tanks M3 are equalized by the communication, an equalized action of the gas suspensions M2 are assured.

BRIEF DESCRIPTION OF THE DRAWINGS

The invention may be best understood by reference to the following description of a preferred embodiments and the drawings in which.

DETAILED DESCRIPTION OF PREFERRED EMBODIMENTS

Figure 1:
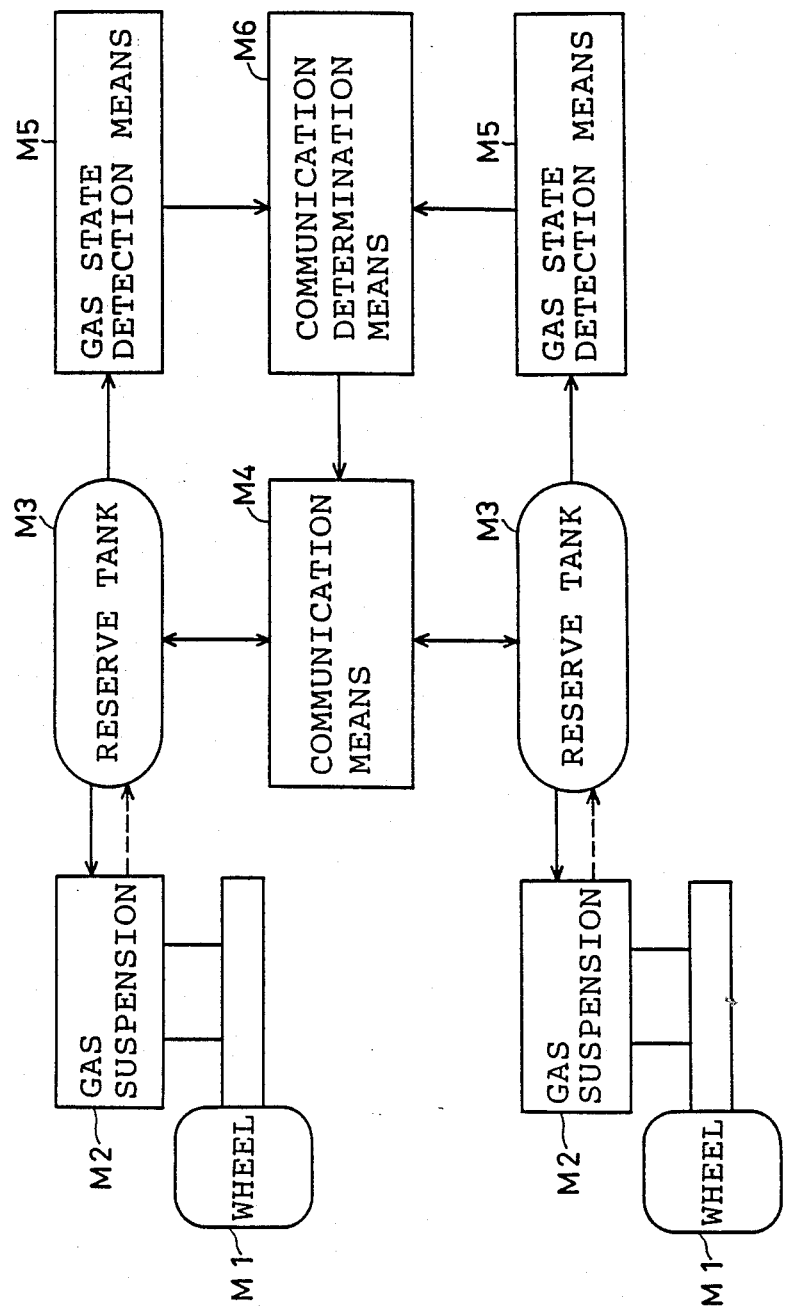
FIG. 1 is a block diagram showing a fundamental structure of the present invention.
Figure 2:
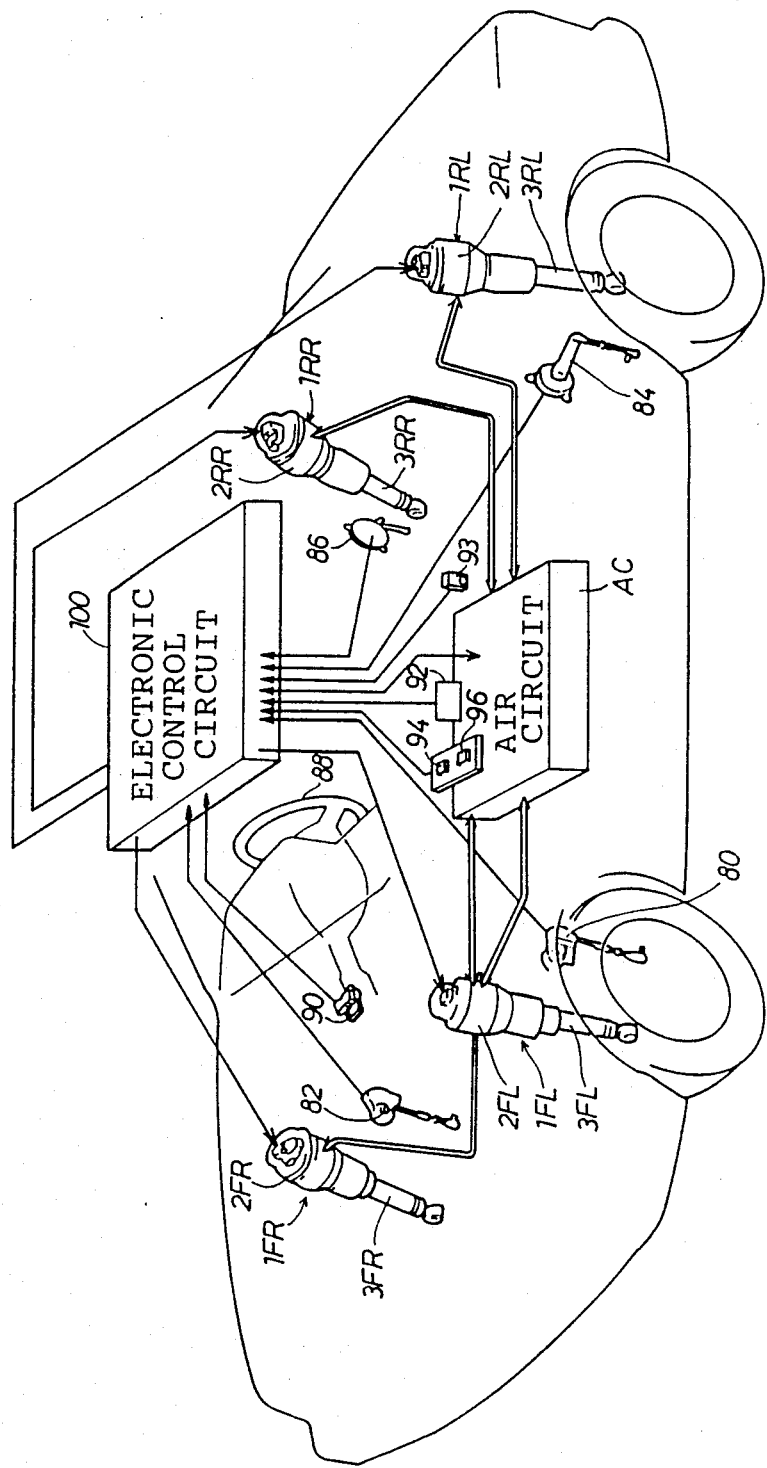
FIG. 2 is a schematic view of an electronic controlled air suspension system according to an embodiment of the present invention.
Figure 3:
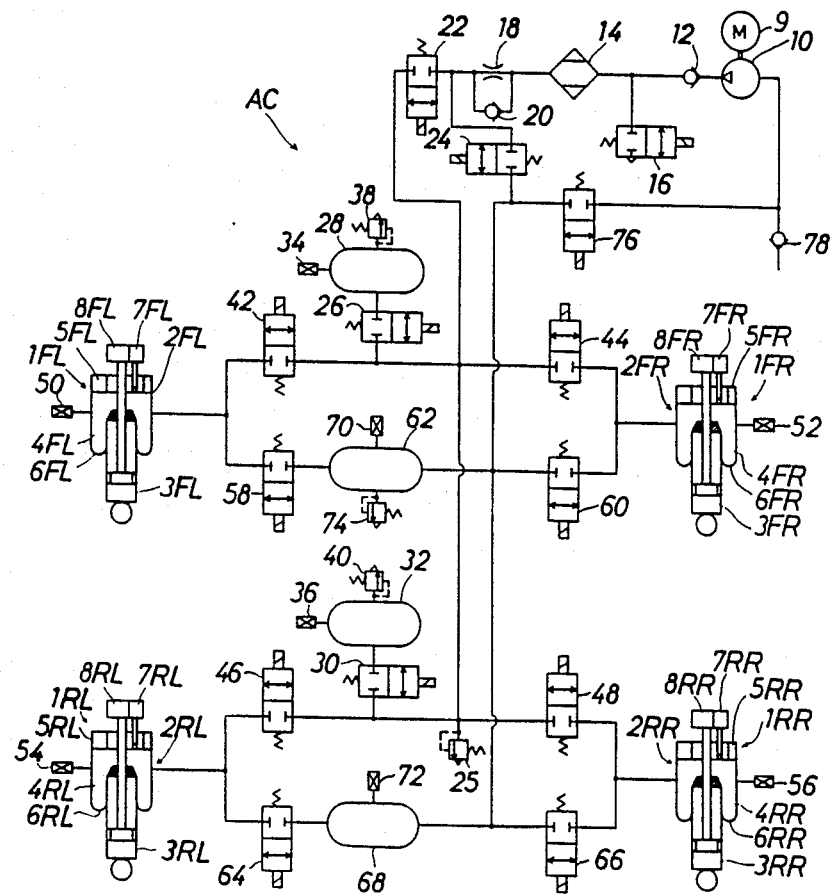
FIG. 3 is an air circuit diagram of the present embodiment.

As shown in FIGS. 2 and 3, the electronic controlled gas suspension system of the present invention is equipped with a front-wheel lefthand suspension 1FL, a front-wheel righthand suspension 1FR, a rear-wheel lefthand suspension 1RL and a rear-wheel righthand suspension 1RR, all of which are connected to an air circuit AC. These suspensions 1FL, 1FR, 1RL and 1RR are equipped with air springs 2FL, 2FR, 2RL and 2RR and shock absorbers 3FL, 3FR, 3RL and 3RR, respectively. The air springs 2FL, 2FR, 2RL and 2RR are equipped with main air chambers 4FL, 4FR, 4RL and 4RR and auxiliary air chambers 5FL, 5FR, 5RL and 5RR, respectively. The main air chambers 4FL, 4FR, 4RL and 4RR are partially formed of diaphragms 6FL, 6FR, 6RL and 6RR so that the height of the vehicle can be changed by supplying and discharging air to and from the main air chambers 4FL, 4FR,4RL and 4RR. The air springs 2FL, 2FR, 2RL and 2RR can have their spring constants changed to "low", "medium" and "high" steps by energizing spring motors 7FL, 7FR, 7RL and 7RR to either provide/block communications between the main air chambers 4FL, 4FR, 4RL and 4RR and the auxiliary air chambers 5FL, 5FR, 5RL and 5RR or switch the air flow rates. The shock absorbers 3FL, 3FR, 3RL and 3RR can have their damping force changed to "low", "medium" and "high" by energizing absorber motors 8FL, 8FR, 8RL and 8RR to control the flow rate of working oil passing through orifices (not shown).

On the other hand, the air circuit AC is equipped with a compressor 10 which is driven by a motor 9 so that it may act as a compressed air supply source for the air springs 2FL, 2FR, 2RL and 2RR. The compressor 10 has its discharge side connected to an air drier 14 and a main discharge valve 16 through a check valve 12 for preventing any back flow. Silica gel is provided in the air drier 14 to remove moisture from the compressed air. This air drier 14 is connected to the respective one side of a supply valve 22 and a connection valve 24 through a fixed throttle 18 and a check valve 20 for preventing any back flow. The other side of the supply valve 22 is connected to a relief valve 25 set at a predetermined pressure, and through a high pressure reservoir valve 26 to a front-wheel side high pressure reserve tank 28, and through another high pressure reservoir valve 30 to a rear-wheel side high pressure reserve tank 32. These high pressure reserve tanks 28 and 32 are respectively equipped with pressure sensors 34 and 36 for detecting the air pressures in the high pressure reserve tanks 28 and 32 and relief valves 38 and 40 set at a predetermined pressure PMAX.

The above-mentioned side of the supply valve 22 is connected through a leveling valve 42 to the main air chamber 4FL, through a leveling valve 44 to the main air chamber 4FR, through a leveling valve 46 to the main air chamber 4RL, and through a leveling valve 48 to the main air chamber 4RR. To these main air chambers 4FL, 4FR, 4RL and 4RR, respectively, there are connected pressure sensors 50, 52, 54 and 56 for detecting the air pressures.

The main air chamber 4FL at the front-wheel lefthand side and the main air chamber 4FR at the front-wheel righthand side are connected to a low pressure reserve tank 62 at the front wheel side, respectively, through a discharge valve 58 and a similar discharge valve 60. Moreover, the main air chamber 4RL at the rear-wheel lefthand side and the main air chamber 4RR at the rear-wheel righthand side are connected to a low pressure reserve tank 68 at the rear wheel side, respectively, through a discharge valve 64 and a similar discharge valve 66. On the other hand, the front-wheel side low pressure reserve tank 62 and the rear-wheel side low pressure reserve tank 68 are connected to have communication at all times. To these low pressure reserve tanks 62 and 68, respectively, there are connected pressure sensors 70 and 72 for detecting the air pressures in the reserve tanks 62 and 68. To the front-wheel side low pressure reserve tank 62, there is connected a relief valve 74 which is set at a predetermined pressure. The two high pressure reserve tanks 28 and 32 and the two low pressure reserve tanks 62 and 68 are made to have the same capacity.

These two low pressure reserve tanks 62 and 68 are connected to the other side of the aforementioned connection valve 24 and further to the suction side of the compressor 10 through a suction valve 76. To the suction side of the compressor 10, there is connected a check valve 78 for intaking external air.

The aforementioned discharge valve 16, supply valve 22, connection valve 24, high pressure reservoir valves 26 and 30, leveling valves 42, 44, 46 and 48, discharge valves 58, 60, 64 and 66, and suction valve 76 are of the normally closed two-position type in the present invention.

The present air circuit AC is equipped at its front wheel side and rear wheel side with the high pressure reserve tanks 28 and 32 and the low pressure reserve tanks 62 and 68. Those reserve tanks may be provided for the air springs 2FL, 2FR, 2RL and 2RR, respectively.

The aforementioned pressure sensors 34 and 36 constitute air state detection means for detecting air pressure in the high pressure reserve tanks 28 and 32, and the high-pressure reservoir valves 26 and 30 constitute the communication means.

As shown in FIG. 2, in the suspension system of the present invention, there are provided: a height sensor 80 for detecting the distance between the lefthand front wheel and the vehicular body, i.e., the lefthand front height; a height sensor 82 for detecting the righthand front height; a height sensor 84 for detecting the lefthand rear height; and a height sensor 86 for detecting the righthand rear height. There are also provided: a steering angle sensor 90 for detecting the steering angle and direction of a steering wheel 88; an acceleration sensor 92 for detecting the acceleration of the vehicular body; and a speed sensor 93 for detecting the vehicular operating speed based on the revolution speed of the output shaft of the transmission (not shown). Also provided are high and low level switches 94 and 96 which are manually operated to instruct the vehicular height.

Figure 4:
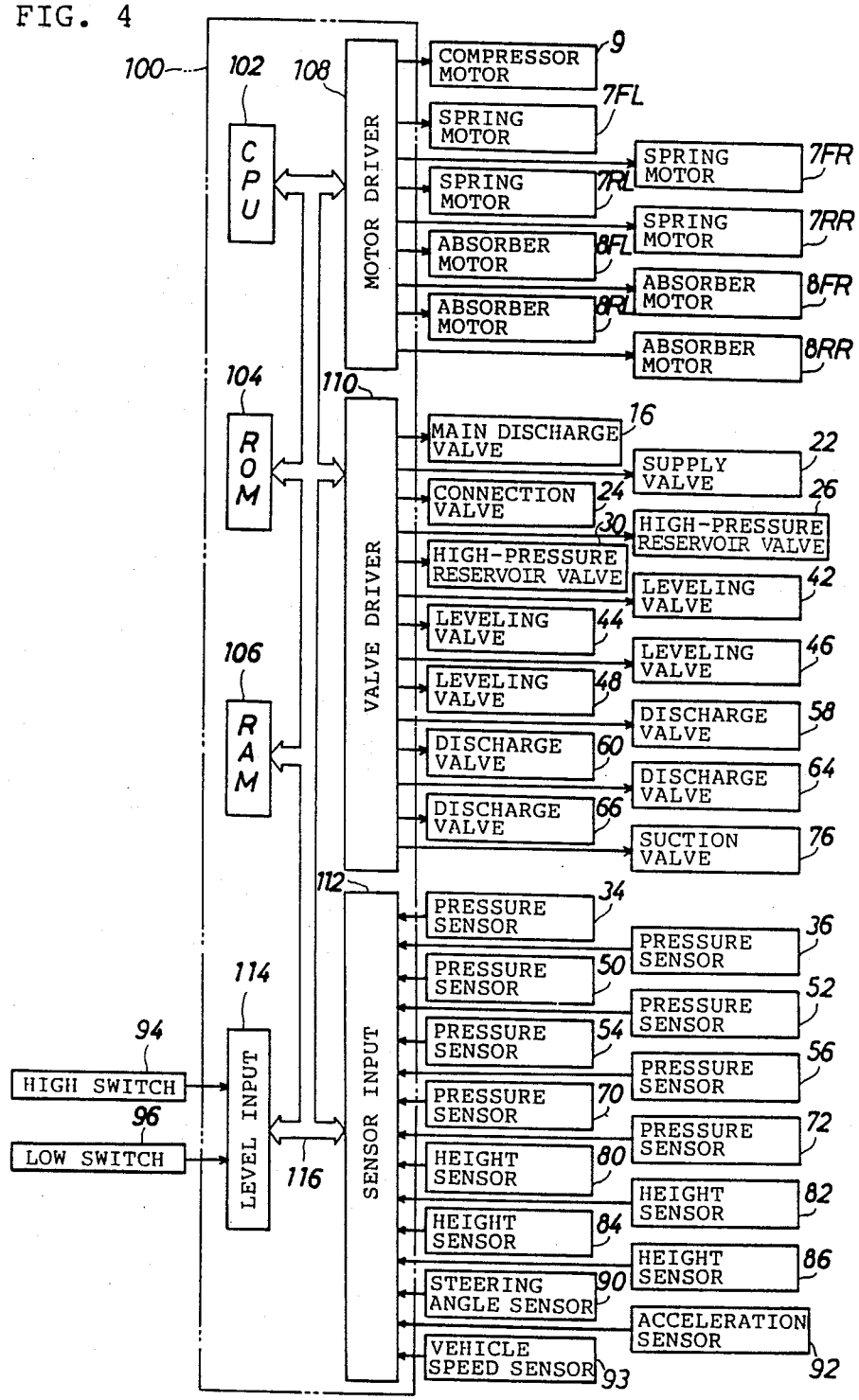
FIG. 4 is a block diagram indicating the construction of an electric system according to the present embodiment.

The electrical system of the present invention will be described with reference to the block diagram shown in FIG. 4. The aforementioned individual air suspensions 1FL, 1FR, 1RL and 1RR are driven and controlled by an electronic control circuit 100 to control the attitude of the vehicle. This electronic control circuit 100 includes, as shown in FIG. 4, known CPU 102, ROM 104 and RAM 106, as its logical arithmetic circuit. These CPU 102, ROM 104 and RAM 106 are mutually connected with input/output circuits, such as a motor driver 108, a valve driver 110, a sensor input circuit 112 and a level input circuit 114 by way of a common bus 116.

The CPU 102 receives the signals of the pressure sensors 34, 36, 50, 52, 54, 56, 70 and 72, the height sensors 80, 82, 84 and 86, the steering angle sensor 90, the acceleration sensor 92 and the speed sensor 93 by way of the sensor input circuit 112, and the signals of the high and low level switches 94 and 96 by way of the level input circuit 114. In response to these signals and the data in the ROM 104 and the RAM 106, on the other hand, the CPU 102 controls the individual air suspensions 1FL, 1FR, 1RL and 1RR by outputting drive signals to the compressor motor 9, the spring motors 7FL, 7FR, 7RL and 7RR and the absorber motors 8FL, 8FR, 8RL and 8RR through the motor driver 108 and by outputting drive signals to the discharge valve 16, the supply valve 22, the connection valve 24, the high pressure reservoir valves 26 and 30, the leveling valves 42, 44, 46 and 48, the discharge valves 58, 60, 64 and 66 and the suction valve 76 through the valve driver 110.

The processing procedures to be executed in the electronic control circuit 100 described above will be explained with reference to the flowchart of FIG. 5.

Figure 5:
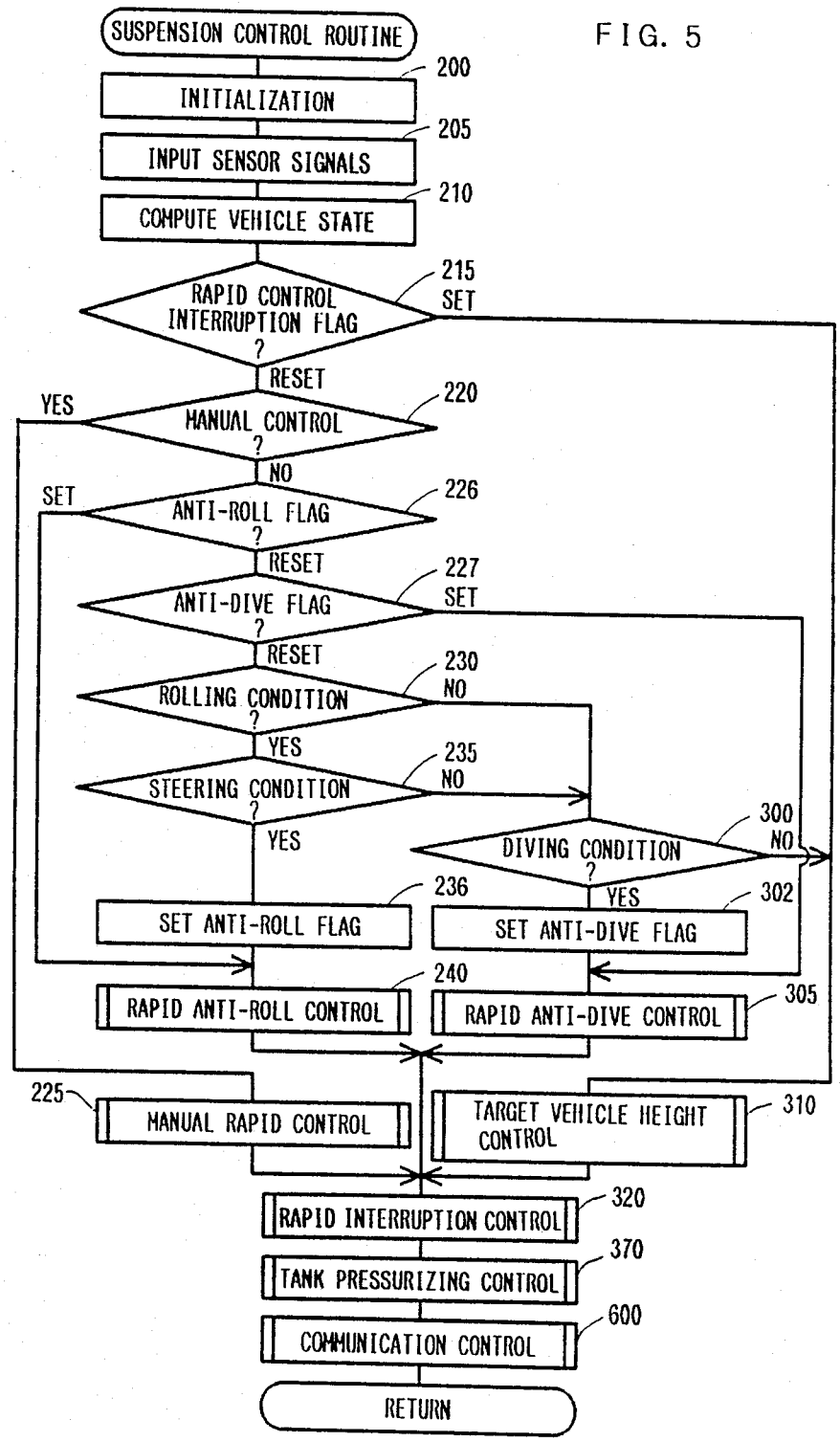
FIG. 5 is a flowchart of a suspension control routine.

When the key switch (not shown) is turned on, the electronic controlled air suspension system of the present invention executes a suspension control routine shown in FIG. 5 as well as other control routines. First, data, flags and so on are initialized at step 200. At step 205, the signals from the pressure sensors 34, 36, 50, 52, 54, 56, 70 and 72, the height sensors 80, 82, 84 and 86, the steering angle sensor 90, the acceleration sensor 92 and the speed sensor 93 are input through the sensor input circuit 112. At step 210, the state of the vehicle including heights at individual wheels, the steering state and the acceleration state is computed by averaging the signals from the individual sensors.

It is subsequently determined at step 215 whether or not a rapid control interruption flag (described later) is set. If NO, it is determined at step 220 whether or not the control is manual by confirming whether or not the high or low level switch 94 or 96 has been operated to input its signal by way of the level input circuit 114. If the high level switch 94 is operated, for example, the manual rapid control for driving and controlling the necessary valves by way of the valve driver 110 is executed at step 225 in response to the predetermined high level value, the present heights detected by the individual height sensors 80, 82, 84 and 86, and the pressures in the main air chambers 4FL, 4FR, 4RL and 4RR, the high pressure reserve tanks 28 and 32 and the low pressure reserve tanks 62 and 68, which are determined by the pressure sensors 34, 36, 50, 52, 54, 56, 70 and 72, respectively. As a result, communications between the high pressure reserve tanks 28 and 30 and the main air chambers 4FL, 4FR, 4RL and 4RR are established so that the compressed air reserved in advance in the high pressure reserve tanks 28 and 30 rapidly spurt into the main air chambers 4FL, 4FR, 4RL and 4RR to raise the vehicle height rapidly to a predetermined high level. When the low level switch 96 is operated, the necessary valves are likewise energized at step 225 in accordance with a predetermined low vehicle level. As a result, communications between the low pressure reserve tanks 62 and 68 and the main air chambers 4FL, 4FR, 4RL and 4RR are established so that the air in the main air chambers 4FL, 4FR, 4RL and 4RR rapidly spurt into the low pressure reserve tanks 62 and 68 to drop the vehicle height rapidly to a predetermined low level.

On the other hand, if it is determined at the aforementioned step 220 that the manual control is not executed and if it is determined at steps 226 and 227 that later-described anti-roll flag and anti-dive flag are not set, the program proceeds to step 230. At this step, it is determined whether or not the computed vehicular state corresponds to the rolling condition. This rolling condition is dictated, for example, by the fact that the vehicle speed detected by the speed sensor 93 is equal to or higher than such a predetermined value that the vehicle is rolled if steered. If YES, i.e., if it is determined that the vehicle is in the rolling condition, then it is determined at step 235 whether or not the steering angle detected by the steering angle sensor 90 is equal to or more than a predetermined value requiring rapid anti-roll control. If YES, the anti-roll flag is set at step 236 to execute the rapid anti-roll control at step 240.

Figure 6:
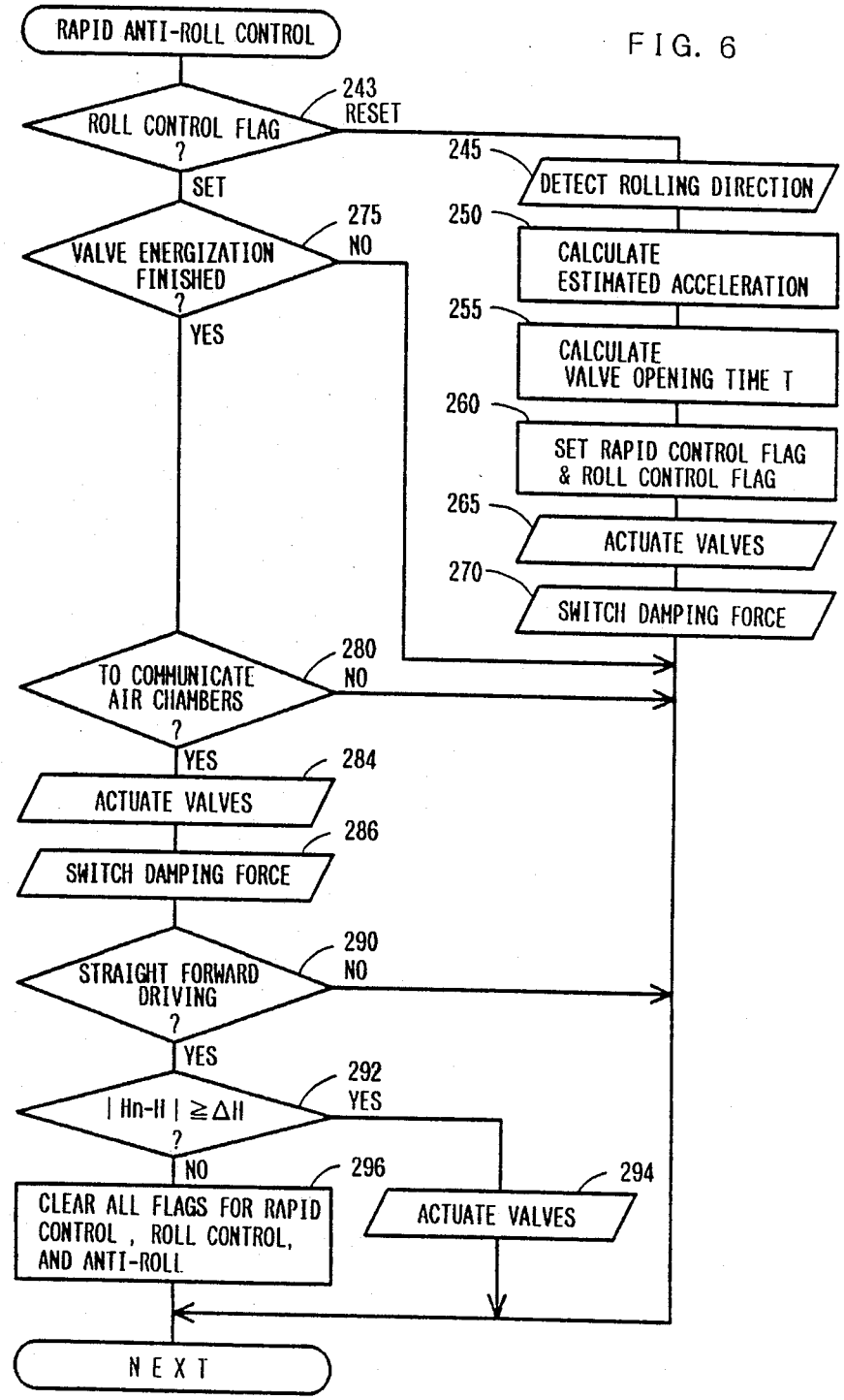
FIG. 6 is a flowchart of an anti-roll rapid control routine.
Figure 12:
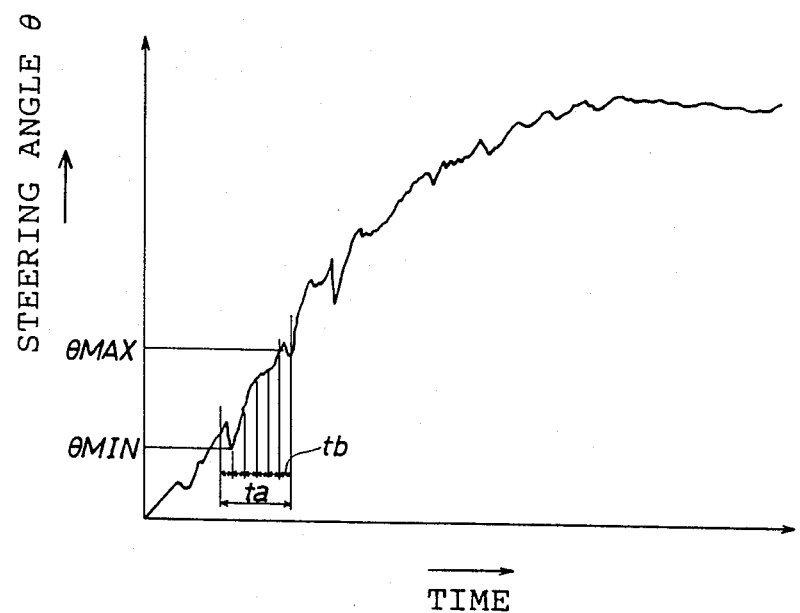
FIG. 12 is a graph showing a relation between a steering angle and time.
Figure 13:
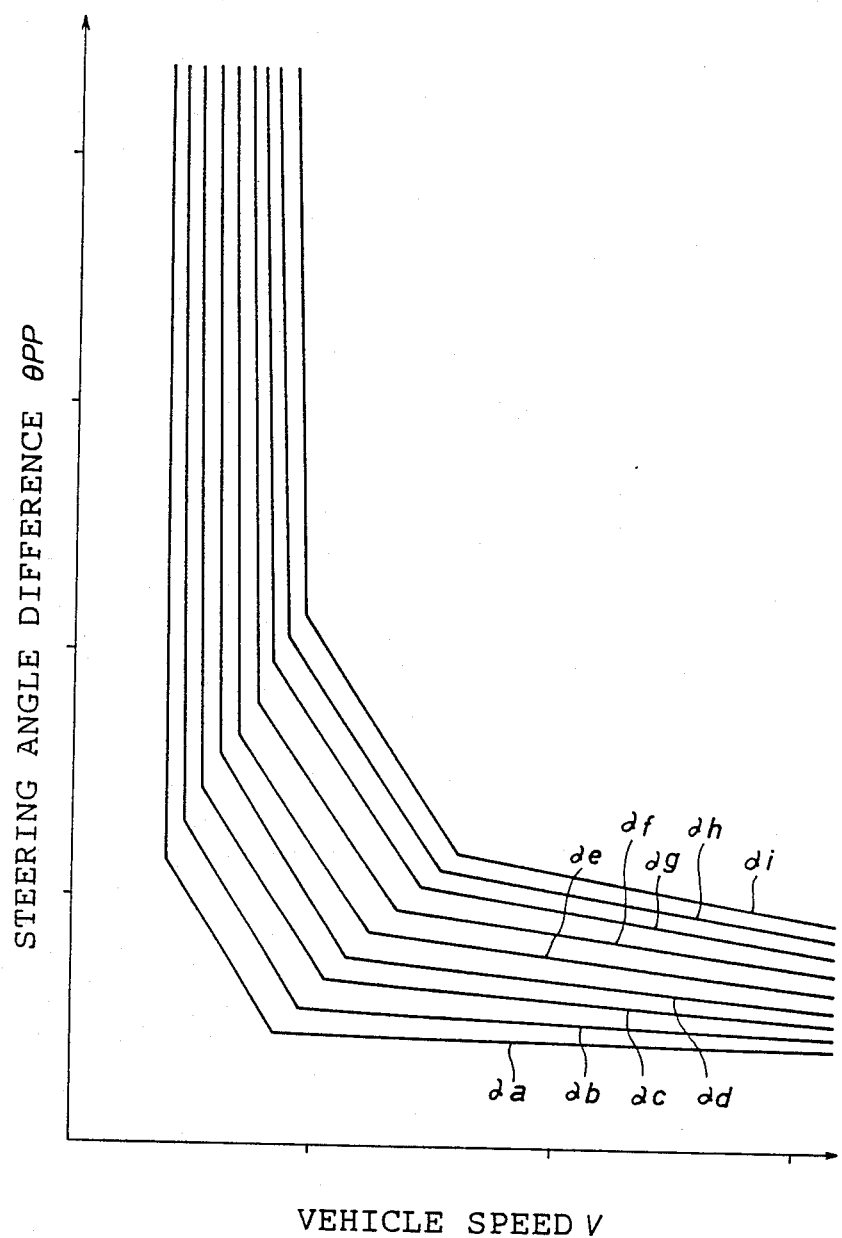
FIG. 13 is a graph showing a relation between a steering angle difference and a vehicle speed with an acceleration as a parameter.

This rapid anti-roll control will be described with reference to FIG. 6. First of all, it is determined at step 243 whether a later-described rolling control flag is set. If NO, the rolling direction is detected at step 245 based on the steering direction detected by steering angle sensor 90. Next, as shown in FIG. 12, for a predetermined time period ta (e.g., 40 ms) immediately after the steering condition has been detected at step 235, a maximum $\theta$MAX and a minimum $\theta$MIN of a steering angle $\theta$ detected by the steering angle sensor 90 are determined every predetermined period tb (e.g., 8 ms). From these maximum $\theta$MAX and minimum $\theta$MIN, a steering angle difference $\theta$PP is computed. As shown in FIG. 13, an estimated transverse acceleration $\alpha$ (e.g., $\alpha a$, $\alpha b$, $\alpha c$, $\alpha d$, $\alpha e$, $\alpha f$, $\alpha g$, $\alpha h$, $\alpha i$) is computed at step 250 from the relation between the steering angle difference $\theta$PP and the present vehicle speed V established beforehand.

Based on the estimated transverse acceleration $\alpha$, a valve opening time T is computed at step 255. At subsequent step 260, the rapid control flag and the rolling control flag are set. Next, the valves are energized at step 265 in accordance with the valve opening time T. If the steering wheel 88 is steered to the right, the high pressure reservoir valves 26 and 30 and the leveling valves 42 and 46 are energized during the valve opening time T so that the compressed air in the high pressure reserve tanks 28 and 32 rapidly spurts into the main air chambers 4FL and 4RL at the lefthand side. Simultaneously, the discharge valves 60 and 66 are energized during the valve opening time T so that the air rapidly spurts into the low pressure reserve tanks 62 and 68 from the main air chambers 4FR and 4RR at the righthand side. On the other hand, if the steering wheel 88 is steered to the left, the valve controls are accomplished at the side opposite to the aforementioned sides.

At this time, the absorber motors 8FL, 8FR, 8RL and 8RR are driven to switch (at step 270) the damping force of the shock absorbers 3FL, 3FR, 3RL and 3RR to "High". Following the routine described above, the rolling of the vehicle, which might be caused by the steering operation, is prevented by the rapid supply or release of the air to and from the main air chambers 4FL, 4FR, 4RL and 4RR. Moreover, the tossing of the vehicle, which might be caused by the supply or release of the air to and from the main air chambers 4FL, 4FR, 4RL and 4RR, is prevented by switching the damping force of the shock absorbers 3FL, 3FR, 3RL and 3RR.

If, after the execution of step 270, the present control routine is repeatedly executed so that the rolling control flag is determined at step 243 to have been set, the present control routine is repeatedly executed till it is determined at step 275 the valve opening time T computed by the execution of step 255 has elapsed. If it is determined at step 275 that the valve opening time T has elapsed the program proceeds to step 280, at which it is determined whether the steering wheel 88 is returned during cornering to a steering angle equal to or smaller than the predetermined value and also it is determined whether the actual transverse acceleration detected by the acceleration sensor 92 drops to a predetermined value or less. If YES, the leveling valves 42, 44, 46 and 48 are energized at step 284 to establish the communications of the main air chambers 4FL, 4FR, 4RL and 4RR. Next, the damping force of the shock absorbers 3FL, 3FR, 3RL and 3RR are switched at step 286 to "Low". When the steering wheel 88 is returned to the straight-forward position and it is determined at step 290 that the steering angle detected by the steering angle sensor 90 is within a predetermined neutral angle range, namely, that the vehicle is running straight, it is determined at step 292 whether or not the absolute value of the difference between a vehicle height H detected by the individual height sensors 80, 82, 84 and 86 and a target height Hn during a normal straight run is larger than a predetermined value $\Delta$H such as the minimum for controlling the vehicle height. If YES, the valves are energized at step 294 to adjust the vehicle height H of the individual wheels to the target value Hn. More specifically, the vehicle height H is rapidly controlled to be the target height Hn by establishing the communications between the high pressure reserve tanks 28 and 32 or the low pressure reserve tanks 62 and 68 and the main air chambers 4FL, 4FR, 4RL and 4RR.

If it is determined at step 292 that the absolute value of the difference between the vehicle height H and the target height Hn becomes smaller than the predetermined value ΔH as the valves are energized, namely, if the vehicle height approaches the target height Hn, it is determined that the rapid anti-roll control has accomplished, and the rapid control flag, the rolling control flag and the anti-roll flag are cleared at step 296.

On the other hand, if the steering wheel 88 has not yet returned and the vehicle is cornering at steps 280 and 290, or if steps 270, 294 and 296 are executed, the program is returned to the suspension control routine of FIG. 5. If neither in the rolling condition at step 230 nor in the steering operation at step 235, it is determined at step 300 whether or not the vehicle is in the diving condition. This diving condition is dictated by the condition under which the brake is operated at a vehicular speed V equal to or higher than a predetermined value Va (e.g., 25 km/h) to cause the dive. If in the diving condition, the anti-dive flag is set at step 302, and the rapid anti-dive control is executed at step 305. In this rapid anti-dive control, respective averaged values of the maximum acceleration αMAX and minimum acceleration αMIN to be detected by the acceleration sensor 92 every predetermined time intervals are computed within a predetermined time period immediately after the determination at step 300. Next, an averaged acceleration difference αPP, i.e., the difference between the averaged maximum acceleration αMAX and the averaged minimum acceleration αMIN, is computed so that an estimated acceleration α0 is computed from a predetermined relation between the average acceleration difference αPP and the actual acceleration at the dive. In accordance with this estimated acceleration α0, the valve opening time T is computed. In response to this valve opening time T, the high pressure reservoir valve 26 and the leveling valves 42 and 44 at the front wheel side and the discharge valves 64 and 66 at the rear wheel side are energized and controlled. As a result, the compressed air flows according to the estimated acceleration α0 from the high pressure reserve tank 28 at the front wheel side into the main air chambers 4FL and 4FR at the front wheel side. In this meanwhile, the air is discharged at the rate according to the estimated acceleration α0 from the main air chambers 4RL and 4RR at the rear wheel side to the low pressure reserve tank 68 at the rear wheel side. Moreover, the damping force of the shock absorbers 3FL, 3FR, 3RL and 3RR are switched to "High". Thus, the vehicle is prevented from diving by the rapid air supply and discharge to and from the main air chambers 4FL, 4FR, 4RL and 4RR.

If, on the other hand, the acceleration detected by the acceleration sensor 92 becomes equal to or lower than the predetermined value, the vehicle height is rapidly controlled to the target value Hn by establishing the communications between the high pressure reserve tanks 28 and 32 or the low pressure reserve tanks 62 and 68 and the main air chambers 4FL, 4FR, 4RL and 4RR.

As in the rapid anti-roll control (step 240), the rapid control flag is set also during the rapid attitude control in the rapid manual control (step 225) and the rapid anti-dive control (step 305). In the present embodiment, the rapid attitude control is exemplified by the rapid manual control, the rapid anti-roll control and the rapid anti-dive control but may additionally include a rapid anti-squat control.

On the other hand, if neither in the rolling state at steps 230 and 235 nor in the diving state at step 300 but if a later-described rapid control interruption flag is set at step 215, the vehicle height is controlled at step 310 to be a target height. In this target height control, the compressor 10 and the individual valves are energized to make each height H of the individual wheels approach the target height Hn, if the absolute value of the difference between the vehicle heights H of the individual wheels detected by the height sensors 80, 82, 84 and 86 and the target height Hn in the normal straight run is larger than the predetermined value ΔH, e.g., the minimum for controlling the vehicle heights. If the height H of a wheel is smaller than the target height Hn, the compressor 10, the supply valve 22 and one of the leveling valves 42, 44, 46 and 48 corresponding to the wheel having the small height H are energized to supply the compressed air to one of the main air chambers 4FL, 4FR, 4RL and 4RR corresponding to the wheel. The rate of the compressed air to be supplied is determined in response to the capacity of the compressor, the flow resistance and so on so that the vehicle height H slowly approaches the target height Hn. If this target height Hn is attained, the compressor 10 and the individual valves 22, 42, 44, 46 and 48 are deenergized.

On the other hand, if the height H at a wheel is larger than the target height, the compressor 10 is not energized, but the main discharge valve 16, the connection valve 24 and one of the discharge valves 58, 60, 64 and 66 corresponding to the wheel of the large height H are energized to discharge the air from one of the main air chambers 4FL, 4FR, 4RL and 4RR corresponding to the wheel. The rate of the air to be discharged is determined according to the opening of the throttle 18, the flow resistance and so on so that the vehicle height H slowly approaches the target value Hn. When the target height Hn is attained, the individual valves 16, 24, 58, 60, 64 and 66 are deenergized.

In the rapid attitude control, for example, by executing at step 240 the rapid anti-roll control, the compressed air in the high-pressure reserve tanks 28 and 32 are consumed, and by executing at step 305 the rapid anti-dive control, only the compressed air in the front wheel-side high-pressure reserve tank 28 is consumed.

Figure 7:
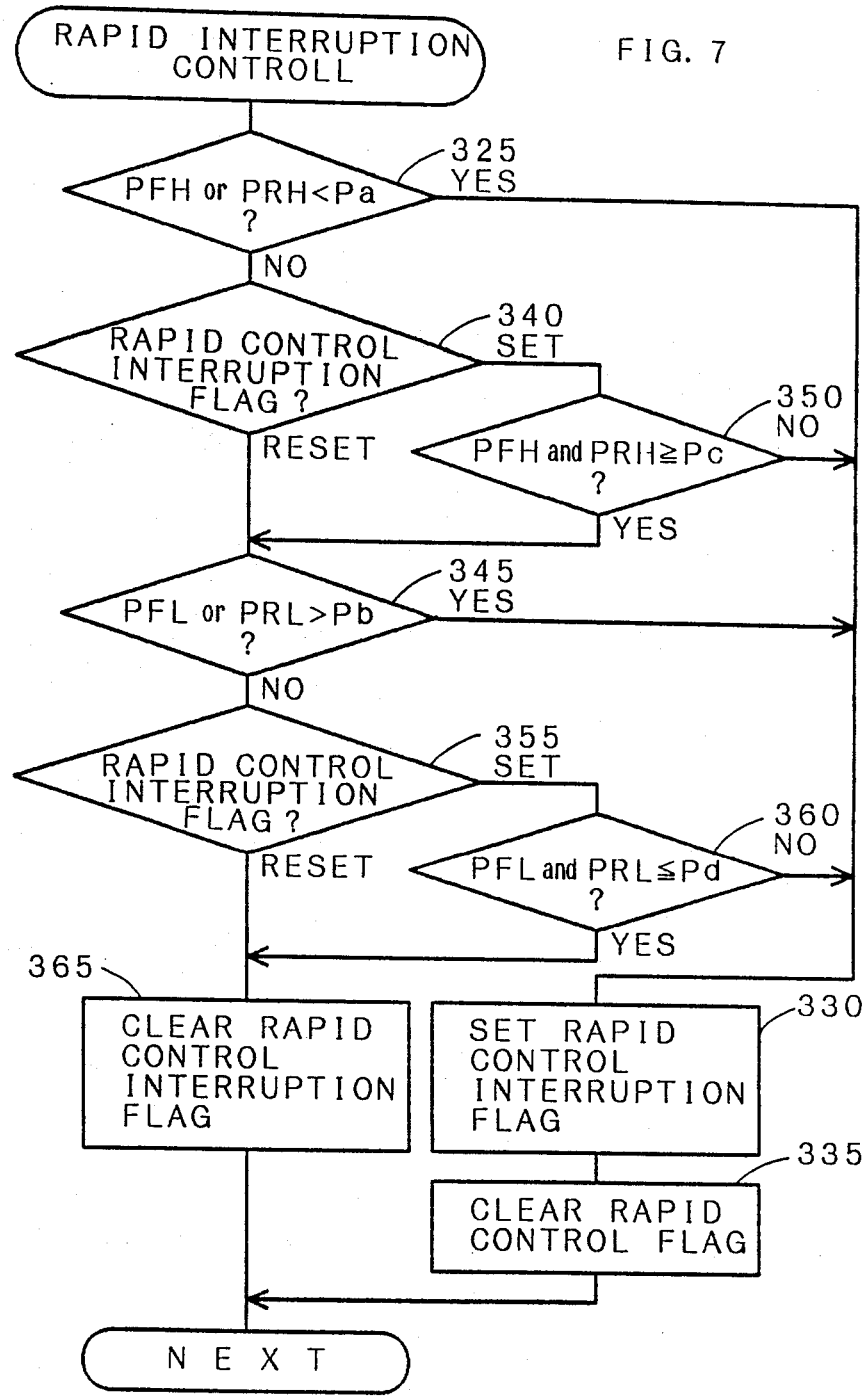
FIG. 7 is a flowchart of a rapid interruption control routine.

After controls described above, a rapid interruption control is executed at step 320. It will be described with reference to the flowchart shown in FIG. 7.

When the aforementioned rapid attitude controls are executed at steps 225, 240 and 305 and the compressed air in the high-pressure reserve tanks 28 and 32 is consumed, it is determined at step 325 whether a pressure PFH in the front-wheel side high pressure reserve tank 28 detected by the pressure sensor 34 or a pressure PRH in the rear-wheel side high pressure reserve tank 32 detected by the pressure sensor 36 becomes lower than a predetermined high pressure interruption pressure Pa for interrupting the rapid attitude control, e.g., 9.5 atms abs. The pressure Pa is determined at a value at which the compressed air in the high pressure reserve tanks 28 and 32 is too much consumed to continue the rapid attitude control. If YES, the rapid control interruption flag is set at step 330. Then, the rapid control flag is cleared at step 335.

On the other hand, if it is determined at step 325 that the detected pressure PFH or PRH is equal to or higher than the high pressure interruption pressure Pa, the program proceeds to step 340. At step 340, it is determined whether the rapid control interruption flag is set. If NO, it is determined at step 345 whether a pressure PFL in the front-wheel side low pressure reserve tank detected by the pressure sensor 70 or a pressure PRL in the rear-wheel side low pressure reserve tank 68 detected by the pressure sensor 72 exceeds a predetermined low pressure interruption pressure Pb for interrupting the aforementioned rapid attitude control, e.g., 6 atms abs. If YES, the foregoing steps 330 and 335 are executed.

If it is determined at step 340 that the rapid control interruption flag is set, the steps 330 and 335 are repeated until it is determined at step 350 that the pressure PFH in the high pressure reserve tank 28 and the pressure PRH in the high pressure reserve tank 32 exceed such a predetermined pressure Pc, e.g., 11 atms abs., which is higher than the predetermined high pressure interruption pressure Pa and is determined as necessary for sufficient execution of the rapid attitude control.

On the other hand, steps 330 and 335 are executed if the condition is such that the pressure PFL or PRL is equal to or lower than the low pressure interruption pressure Pb at step 345, if the rapid control interruption flag is set at step 355, and if the pressure PFL in the low pressure reserve tank 62 and the pressure PRL in the low pressure reserve tank 68 exceed such a predetermined pressure Pd, e.g., 5 atms abs. which is lower than the predetermined low pressure interruption pressure Pb and is determined as necessary for sufficient execution of the rapid control at step 360. If it is determined at step 360 that the pressures PFL and PRL do not exceed the predetermined pressure Pd, the rapid control interruption flag is cleared at step 365, assuming that the pressures in the high pressure reserve tanks 28 and 32 are equal to or higher than the predetermined pressure Pc whereas the pressures in the low pressure reserve tanks 62 and 68 are equal to or lower than the predetermined pressure Pd so that the rapid attitude control can be executed by executing later-described tank pressure controls. If, on the other hand, it is determined at step 355 that the rapid control interruption flag is not set, step 365 is executed.

Reference is now made to the flowchart of FIG. 5. If it is determined at step 215 that the rapid control interruption flag is set, the routine proceeds to step 310 without any execution of steps 220 and 305, assuming that the rapid attitude control cannot be executed by the high pressure reserve tanks 28 and 32 and the low pressure reserve tanks 62 and 68. Then, the program proceeds to step 320 at which the rapid interruption control 320 is executed.

Figure 9:
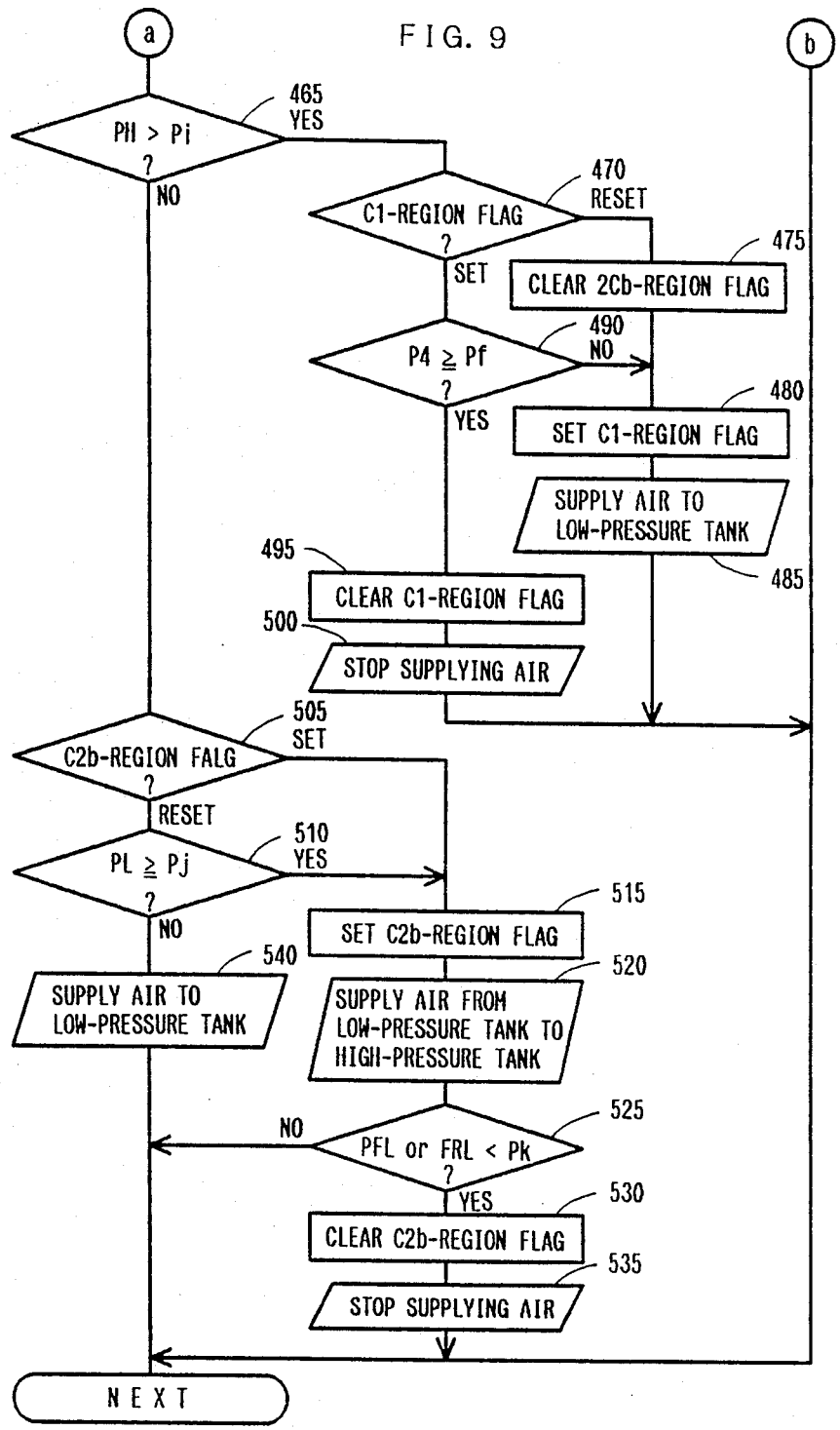
Figure 10:
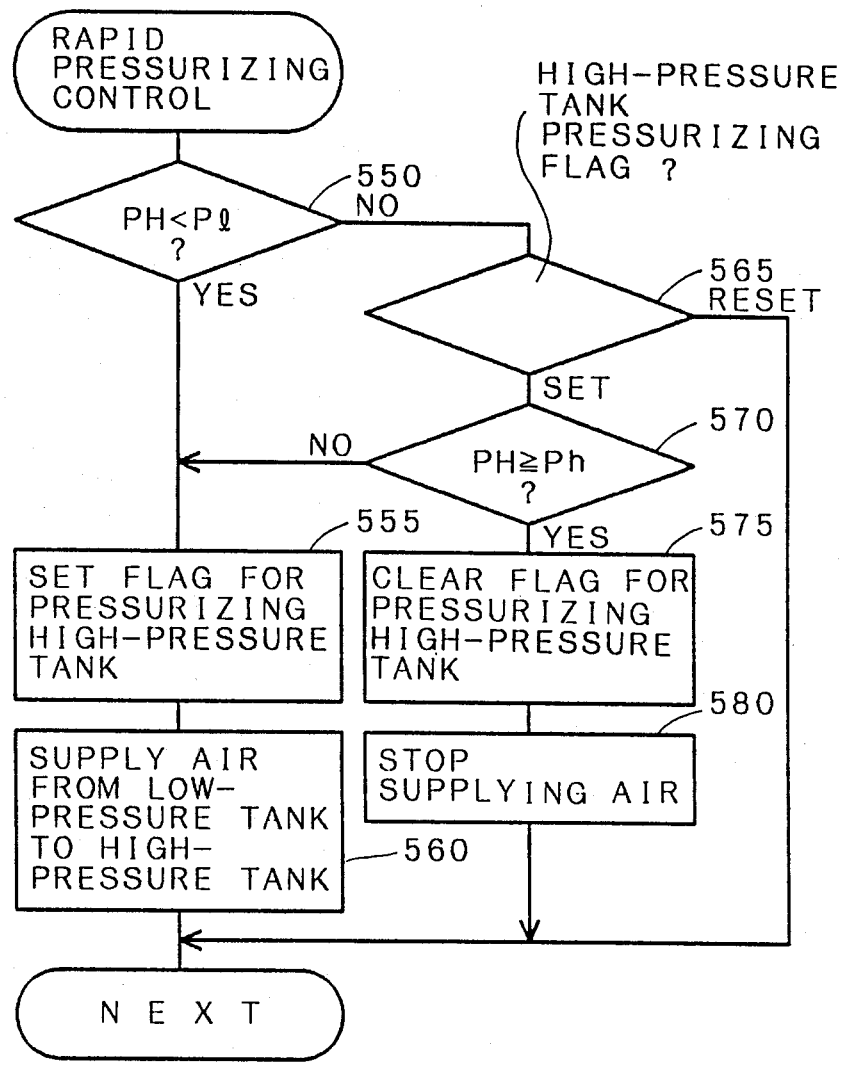
FIG. 10 is a flowchart of a rapid pressurizing control routine.
Figure 14:
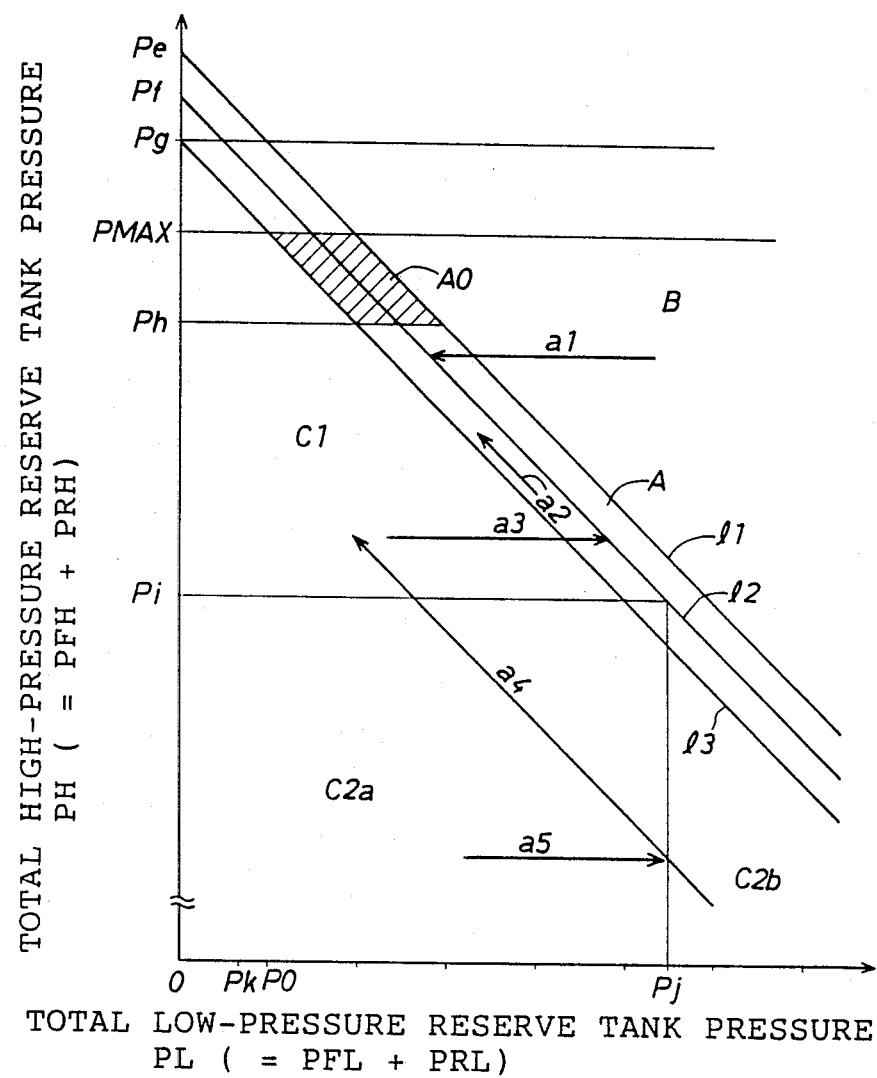
FIG. 14 is a graph indicating a relation between the total pressure of high-pressure reserve tanks and the total pressure of low-pressure reserve tanks.

The rapid interruption control 320 is followed by the tank pressure controls to be executed at step 370. This tank pressure controls will be described in detail with reference to the flowcharts shown in FIG. 8 to 10 and the graph illustrated in FIG. 14 in connection with the pressure change caused by the air supply and discharge to and from the individual reserve tanks 28, 32, 62 and 68. In FIG. 14, the abscissa plots the total low-pressure reserve tank pressure PL dictating the low pressure air state, i.e., the sum of the pressure PFL in the front-wheel side low pressure reserve tank 62 and the pressure PRL in the rear-wheel side low pressure reserve tank 68, and the ordinate plots the total high-pressure reserve tank pressure PH dictating the high pressure air state, i.e., the sum of pressure PFH in the front-wheel side high pressure reserve tank 28 and the pressure PRH in the rear-wheel side high pressure reserve tank 32.

Figure 8:
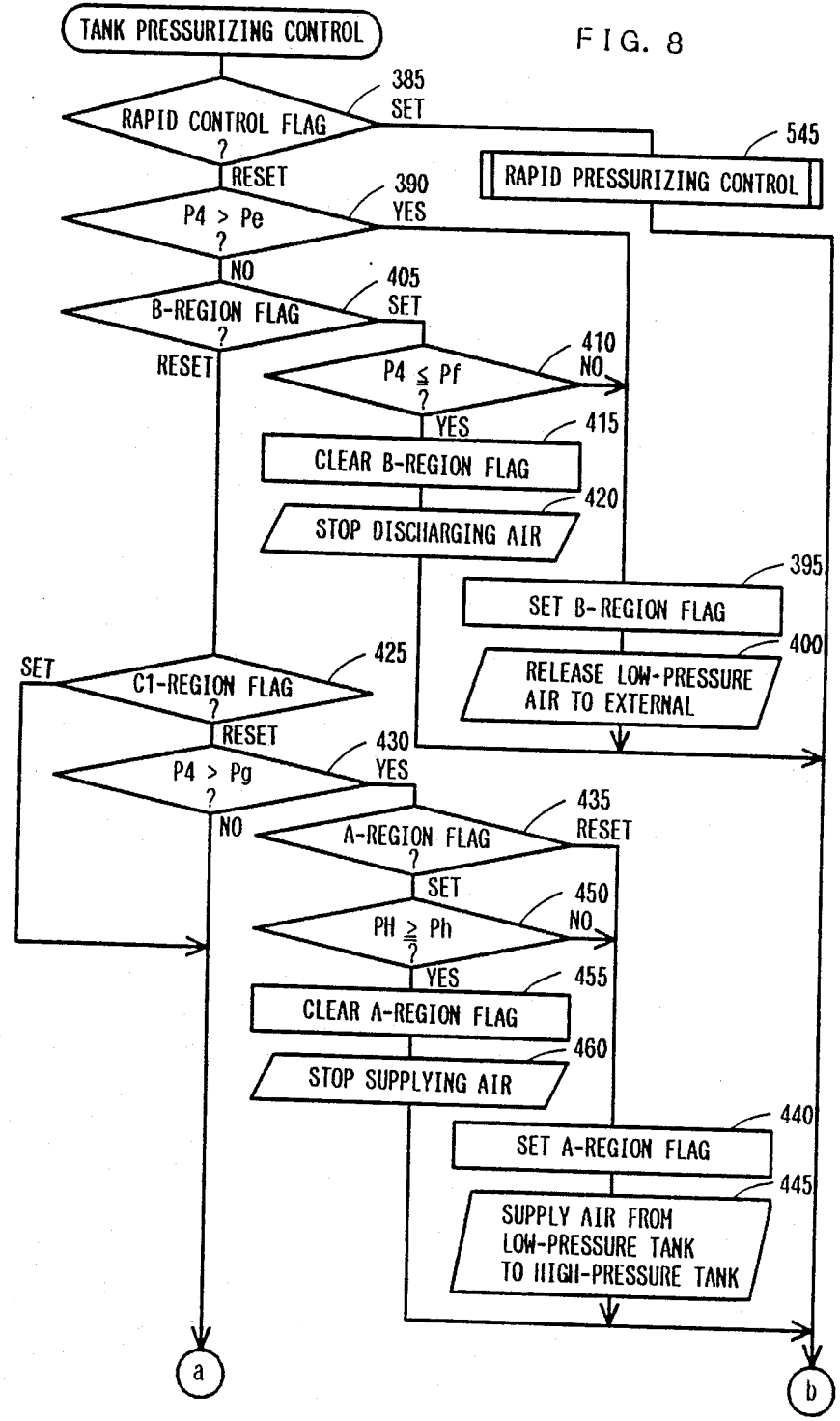
FIGS. 8 and 9 indicate a flowchart of a routine for controlling pressure of a reserve tank.

In the flowchart of FIG. 8, it is first determined at step 385 whether the rapid control flag is set. If NO, i.e., the present condition is not under the rapid attitude control, it is determined at step 390 whether a sum P4 (=PFH+PRH+PFL+PRL) in the individual reserve tanks 28, 32, 62 and 68 detected by the pressure sensors 34, 36, 70 and 72, respectively, exceeds a predetermined overpressure Pe dictating an excessive amount of air, e.g., 36 atms abs. If YES, a B region flag is set at step 395. This B region higher than the overpressure Pe is shown in FIG. 14 above a straight line l1. The region indicates the state in which an excessive amount of air is reserved. When the B region flag is set, the discharge valve 16 and the connection valve 24 are energized to establish the connections of the two low pressure reserve tanks 62 and 68 with the external thereby to preferentially discharge the low pressure air to the external at step 400. Under the condition that the pressure sum P4 is determined at step 390 to be equal to or lower than the overpressure Pe and it is determined at step 405 that the B region flag is set, steps 395 and 400 are repeated until the pressure sum P4 is determined at step 410 to be equal to or lower than a first predetermined pressure Pf dictating an appropriate air state, e.g., 35 atms abs. When the pressure sum P4 is determined at step 410 to be lower than the first predetermined pressure Pf, the B region flag is cleared at step 415, and the discharge valve 16 and the connection valve 24 are deenergized at step 420 to stop the air discharge. As a result, the pressure sum P4 is changed from the B region of FIG. 14 along an arrow a1 to the first predetermined pressure Pf on a line l2 with the total high-pressure reserve tank pressure PH being held constant.

On the other hand, if the condition is such that the pressure sum P4 is below the overpressure Pe at step 390, the B region flag is not set at step 405, and if a later-described C1 region flag is not set at step 425, it is determined at step 430 whether or not the pressure sum P4 exceeds a predetermined underpressure Pg dictating a short air state, e.g., 34 atms abs. If the answer is YES at step 430 and if it is determined at step 435 that an A region flag is not set, the A region flag is set at step 440. This A region is such a region as is defined between a line l1 and a line l3 along which the pressure sum P4 is equal to the underpressure Pg, as seen from FIG. 14. When the A region flag is set, the compressor 10, the supply valve 22, the high pressure reservoir valves 26 and 30 and the suction valve 76 are energized to compress and supply the low pressure air in the low pressure reserve tanks 62 and 68 to the high pressure reserve tanks 28 and 32 at step 445. As a result, the pressure sum P4 does not become equal to or lower than the underpressure Pg at step 430, but the total high-pressure reserve tank pressure PH rises whereas the total low-pressure reserve tank pressure PL drops along an arrow a2 shown in FIG. 14.

When the total high-pressure reserve tank pressure PH is determined at step 450 to exceed a second predetermined pressure Ph dictating a sufficient pressure reserved for executing the rapid attitude control, e.g., 30 atms abs. as a result of the supply of the compressed air to the high pressure reserve tanks 28 and 32, the A region flag is cleared (reset) at step 455. At subsequent step 460, the compressor 10, the supply valve 22, the high pressure reservoir valves 26 and 30 and the suction valve 76 are deenergized to stop the supply of the compressed air to the high pressure reserve tanks 28 and 32. As a result, the pressure sum P4 is within the A region, i,e., under the overpressure Pe and over the underpressure Pg, and the total high-pressure reserve tank pressure PH is over the second predetermined pressure Ph. Namely, the air state in the reserve tanks 28, 32, 62 and 68 is within an A0 region as hatched in FIG. 14.

On the other hand, if the pressure sum P4 is determined at step 430 to be equal to or less than the underpressure Pg and if the total high-pressure reserve tank pressure PH is determined at step 465 (FIG. 9) to exceed a predetermined pressure Pi, e.g., 24 atms abs., which is lower than the second predetermined pressure Ph and near the lowest pressure necessary for the rapid attitude control, e.g., 24 atms abs., it is determined at step 470 whether the C1 region flag is set. If NO, a later-described C2b region flag is cleared at step 475, and the C1 region flag is set at step 480. At this time, the air state in the reserve tanks 28, 32, 62 and 68 is in the C1 region, which is located below the line l3 and above the predetermined pressure Pi, as seen from FIG. 14. When the C1 region flag is set, the compressor 10 and the connection valve 24 are energized to compress and preferentially supply the air to the low pressure reserve tanks 62 and 68 through the check valve 78 at step 485. If it is determined at step 490 that the pressure sum P4 exceeds the aforementioned first predetermined pressure Pf by supplying the air to the low pressure reserved tanks 62 and 68 at step 485, the C1 region flag is cleared at step 495, and the compressor 10 and the connection valve 24 are deenergized at step 500 to stop the supply of air to the low pressure reserve tanks 62 and 68. As a result, the pressure sum P4 shifts from the C1 region to the A region of FIG. 14, more exactly, to the first predetermined pressure Pf on the line l2 along an arrow a3 with the total high-pressure reserve tank pressure PH being kept constant. Since, in the A region, the C1 region flag is cleared at step 495, steps 430 to 460 are executed so that the air state in the reserve tanks 28, 32, 62 and 68 comes into the A0 region along the arrow a2.

On the other hand, when the total high-pressure reserve tank pressure PH is equal to or lower than the predetermined pressure Pi at step 465, if it is determined at step 505 that the C2b region flag is not set, and if it is determined at step 510 that the total low-pressure reserve tank pressure PL is equal to or higher than a predetermined pressure Pj near the highest pressure for the rapid attitude control, e.g., 11 atms abs., the C2b region flag is set at step 515. At this time, the air state in the reserve tanks 28, 32, 62 and 68 is in the C2b region, which is located below the line l3 and above the predetermined pressure Pj, as seen from FIG. 14. When the C2b region flag is set, the compressor 10, the supply valve 22, the high pressure reservoir valves 26 and 30 and the suction valve 76 are energized as in step 445 to preferentially compress and supply the low pressure air in the low pressure reserve tanks 62 and 68 to the high pressure reserve tanks 28 and 32 at step 520.

When it is determined at step 525 that at least one of the pressure PFL and PRL in the low pressure reserve tanks 62 and 68 becomes lower than a predetermined pressure Pk dictating a sufficient pressure necessary for the rapid attitude control, e.g., 1.5 atms abs. by the supply of the low pressure air to the high pressure reserve tanks 28 and 32, the C2b region flag is cleared at step 530. Then, at step 535, the compressor 10, the supply valve 22, the high pressure reservoir valves 26 and 30 and the suction valve 76 are deenergized to stop the supply of the low pressure air to the high pressure reserved tanks 28 and 32. As a result, the total high-pressure reserve tank pressure PH rises whereas the total low-pressure reserve tank pressure PL drops along an arrow a4, as seen from FIG. 14. When the pressure sum P4 enters into the C1 region, the steps 465 to 500 are executed so that the air state then shifts along the arrow a3 to the A region. Next, steps 430 to 460 are executed to bring the air state in the reserve tanks 28, 32, 62 and 68 into the A0 region along the arrow a2.

When the total low-pressure reserve tank pressure PL becomes lower than the predetermined pressure Pj, the compressor 10 and the connection valve 24 are energized at step 540 to compress and preferentially supply the external air to the low-pressure reserve tanks 62 and 68 through the check valve 78. If it is determined at step 510 that the total low-pressure reserve tank pressure PL exceeds the predetermined pressure Pj as a result of the supply of the compressed air to the low pressure reserve tanks 62 and 68, steps 515 to 535 are executed. If the air state is within a C2a region defined by the predetermined pressures Pi and Pj, as shown in FIG. 14, the total low-pressure reserve tank pressure PL rises along an arrow a5. When the total low-pressure reserve tank pressure PL exceeds the predetermined pressure Pj, the air state in the reserve tanks 28, 32, 62 and 68 enters into the A0 region along the arrows a4, a3 and a2.

If, on the contrary, it is determined at the foregoing step 385 (FIG. 8) that the rapid control flag is set, namely, if the rapid attitude control such as the rapid anti-roll control is being performed, a rapid pressurizing control is executed at step 545. This rapid pressurizing control will be explained with reference to FIG. 10. First of all, it is determined at step 550 whether the total high-pressure reserve tank pressure PH is lower than such a predetermined rapid pressurizing pressure Pl sufficient for the rapid attitude control, e.g., 28 atms abs. as is lower than the aforementioned second predetermined pressure Ph. If YES, a high pressure reserve tank pressurizing flag is set at step 555. Next, the compressor 10, the supply valves 26 and 30 and the suction valve 76 are energized at step 560 to compress and supply either the air in the low pressure reserve tanks 62 and 68 or the external air to the high pressure reserve tanks 28 and 32. As a result, if the pressure sum P4 is lower than the under pressure Pg and within the range C1, C2a or C2b the total high-pressure reserve tank pressure PH rises whereas the total low-pressure reserve tank pressure PL drops, as indicated by the arrow a4. When the total low-pressure reserve tank pressure PL drops to closely approach a sum P0 of atmospheric pressure, the external air is compressed and supplied to the high pressure reserve tanks 28 and 32 through the check valve 78. As a result, the total high-pressure reserve tank pressure PH rises, as indicated by an arrow a6, with the total low-pressure reserve tank pressure PL being maintained at an approximate atmospheric sum P0. When, on the other hand, the pressure sum P4 is between the overpressure Pe and the underpressure Pg, i.e., within the A region, the total high-pressure reserve tank pressure PH rises whereas the total low-pressure reserve tank pressure PL drops, as indicated by the arrow a2, like the aforementioned step 445. When the pressure sum P4 exceeds the overpressure Pe, i.e., within the B region, the total high-pressure reserve tank pressure PH rises whereas the total low-pressure reserve tank pressure PL drops, as indicated by an arrow a7. Thus, the time period for pressurizing the high pressure reserve tanks 28 and 32 is shortened by the supply of the air from the low pressure reserve tanks 62 and 68 to the high pressure reserve tanks 28 and 32.

If it is determined at step 550 that the total high-pressure reserve tank pressure PH exceeds the predetermine pressure by supplying air from either the low pressure reserve tanks 62 and 68 or the external to the high pressure reserve tanks 28 and 32, the program proceeds to step 565. If it is determined at step 565 that the high pressure reserve tank pressurizing flag has already been set, steps 555 and 560 are repeated to supply the air from either the low pressure reserve tanks 62 and 68 or the external to the high pressure reserve tanks 28 and 32 until the total high-pressure reserve tank pressure PH exceeds the aforementioned second predetermined pressure Ph (step 570). When PH exceeds Ph at step 570, the high pressure reserve tank pressurizing flag is cleared at step 575, and the compressor 10, the supply valves 26 and 30 and the suction valve 76 are deenergized at step 580 to stop the air supply from either the low pressure reserve tanks 62 and 68 or the external to the high pressure reserve tanks 28 and 32.

In the electronic controlled air suspension system of the present embodiment, the control is made to supply/discharge air from/to the external so that the pressure sum P4 may come into the A region. Then, the air is supplied from the low pressure reserve tanks 62 and 68 to the high pressure reserve tanks 28 and 32 so that the air suspension system can be used for an extended period of time without inviting any shortage of the air. Moreover, since the low-pressure air in the low pressure reserve tanks 62 and 68, which is higher than the atmospheric level, is not released to the external but is compressed and supplied to the high pressure reserve tanks 28 and 32, energy loss is minimized and the time period for pressurizing the high pressure reserve tanks 28 and 32 is shortened. Furthermore, the compressed air is not supplied directly to the high pressure reserve tanks 28 and 32 but once reserved in the low pressure reserve tanks 62 and 68 and then supplied to the high pressure reserve tanks 28 and 32. As a result, the load upon the compressor motor 9 is decreased so that the capacity of the motor 9 can be reduced.

During the rapid attitude control, if the total high-pressure reserve tank pressure PH becomes lower than the predetermined pressure Pl, the air is preferentially supplied to the high pressure reserve tanks 28 and 32 before the high-pressure reserve tank pressures PFH and PRH attain the high pressure interruption pressure Pa or before the low-pressure reserve tank pressures PFL and PRL attain the low-pressure interruption pressure Pb. As a result, even if the rapid attitude control is repeatedly executed on a winding road before the two high-pressure tank pressure PFH and PRH attain the high-pressure interruption pressure Pa or the two low-pressure reserve tank pressures PFL and PRL attain the low-pressure interruption pressure Pb, the number of the repetitions can be increased. Moreover, the pressurizing time period is shortened because the low-pressure air is taken out from the low pressure reserve tank 62 and 68 and supplied to the high pressure reserve tanks 28 and 32.

When the condition corresponds to any one of the cases set forth, i.e., if the total high-pressure reserve tank pressure PH is determined at step 550 to be equal to or higher than the rapid pressurizing pressure Pl and the high-pressure reserve tank pressurizing flag is not set at step 565; if step 560 or 580 is executed; or if steps 400, 420, 445, 460, 485, 500, 535 and 540 are executed, a communication control shown in FIG. 5 is executed at step 600.

The communication control will be described with reference to the flowchart of FIG. 11.

First of all, it is determined at step 605 whether the absolute value of the difference between the pressure PFH in the front wheel side high-pressure reserve tank 28 and the pressure PRH in the rear wheel side high pressure reserve tanks 32 exceeds a predetermined maximum pressure difference Pm, e.g., 1 atms abs. The maximum pressure difference Pm is set at a value over which a difference may occur in the acting time of the air springs 2FL, 2FR, 2RL and 2RR when the rapid attitude control is executed. If YES at step 605, i.e., if $|PFH-PRH|>Pm$, a high-pressure reserve tank communication flag is set at step 610. Then, at step 615, communication is established between the high-pressure reserve tanks 28 and 30 by energizing the high-pressure reservoir valves 26 and 30. As a result, the compressed air is supplied from one of the high-pressure reserve tanks with higher pressure to the other with lower pressure. Such air flow brings a result that the absolute value of the difference between PFH and PRH becomes equal to or lower than the maximum pressure difference Pm, i.e., $|PFH-PRH|\leq Pm$, at step 605. Then, the program proceeds to step 602 at which it is determined whether the high-pressure reserve tank communication flag is set. If YES, it is determined at step 625 whether the aforementioned value $|PFH-PRH|$ is lower than a predetermined pressure difference Pn, i.e., 0.5 atms abs., which is lower than the maximum pressure difference Pm. The value of Pn is determined so that the there is no substantial difference among the acting time of the air springs 2FL, 2FR, 2RL and 2RR. If it is determined at step 625 that $|PFH-PRH|\geq Pn$, the high-pressure reserve tank communication flag is set at step 610 so that communication is established between the high-pressure reserve tanks 28 and 32 at step 615. Steps 610 and 615 are repeatedly executed until the value $|PFH-PRH|$ becomes lower than the pressure difference Pn at step 625. If it is determined at step 625 that $|PFH-PRH|<Pn$, the high-pressure reserve tank communication flag is cleared at step 630 so as to stop the communication between the high-pressure reserve tanks 28 and 32 at step 635.

If it is determined at step 605 that $|PFH-PRH|\leq Pm$ and also determined at step 602 that the high-pressure reserve tank communication flag is not set, or if step 615 and 635 are executed, the program proceeds to "NEXT" and returns to the suspension control routine of FIG. 5.

The process steps at steps 605 and 615 act as the communication control means. In the present embodiment, the individual reserve tanks 28, 32, 62 and 68 are constructed to have an equal capacity, and the air state is detected in terms of the individual pressures PFL, PFH, PRL and PRH. If, however, the individual reserve tanks 28, 32, 62 and 68 have different capacities, the air state may be detected in terms of the products of these different capacities and the individual pressures PFL, PFH, PRL and PRH. If, for example, the reserve tanks 28, 32, 62 and 68 are equipped with sliding pistons to vary the capacities of the reserve tanks in response to the amount of air to be reserved, the displacements of the pistons may be detected to determine the varying capacities so that the air state may be detected in terms of the product of the capacities and the pressures.

In the electronic controlled air suspension system according to the present embodiment, the rapid attitude control is accomplished by using a plurality of reserve tanks, i.e., the high pressure reserve tanks 28 and 32 and the low pressure reserve tanks 62 and 68. When the absolute value |PFH−PRH| becomes larger than the maximum pressure difference Pm, the communication is established between the high pressure reserve tanks 28 and 32 so that the pressures PFH and PRH are set to be almost equal.

According to the electronic controlled air suspension system of the present embodiment, two high-pressure reserve tank pressures PFH and PRH can be maintained to be almost equal even though the consumption rate of the compressed air in the high pressure reserve tanks 28 and 32 differs from each other, by rapidly supplying the compressed air from the high pressure reserve tanks 28 and 32 to each of the air springs 2FL, 2FR, 2RL and 2RR, and by executing the rapid attitude control such as rapid anti-roll control (step 240) and the rapid anti-dive control (step 305). Accordingly, the difference never occurs between the time period for supplying the compressed air from the front wheel-side high pressure reserve tanks to the front wheel-side air springs 2FL and 2FR and the time period for supplying the air from the rear wheel-side high-pressure reserve tanks to the rear wheel-side air springs 2RL and 2RR. As a result, the actions of the air springs 2FL, 2FR, 2RL and 2RR are equalized.

Figure 15:
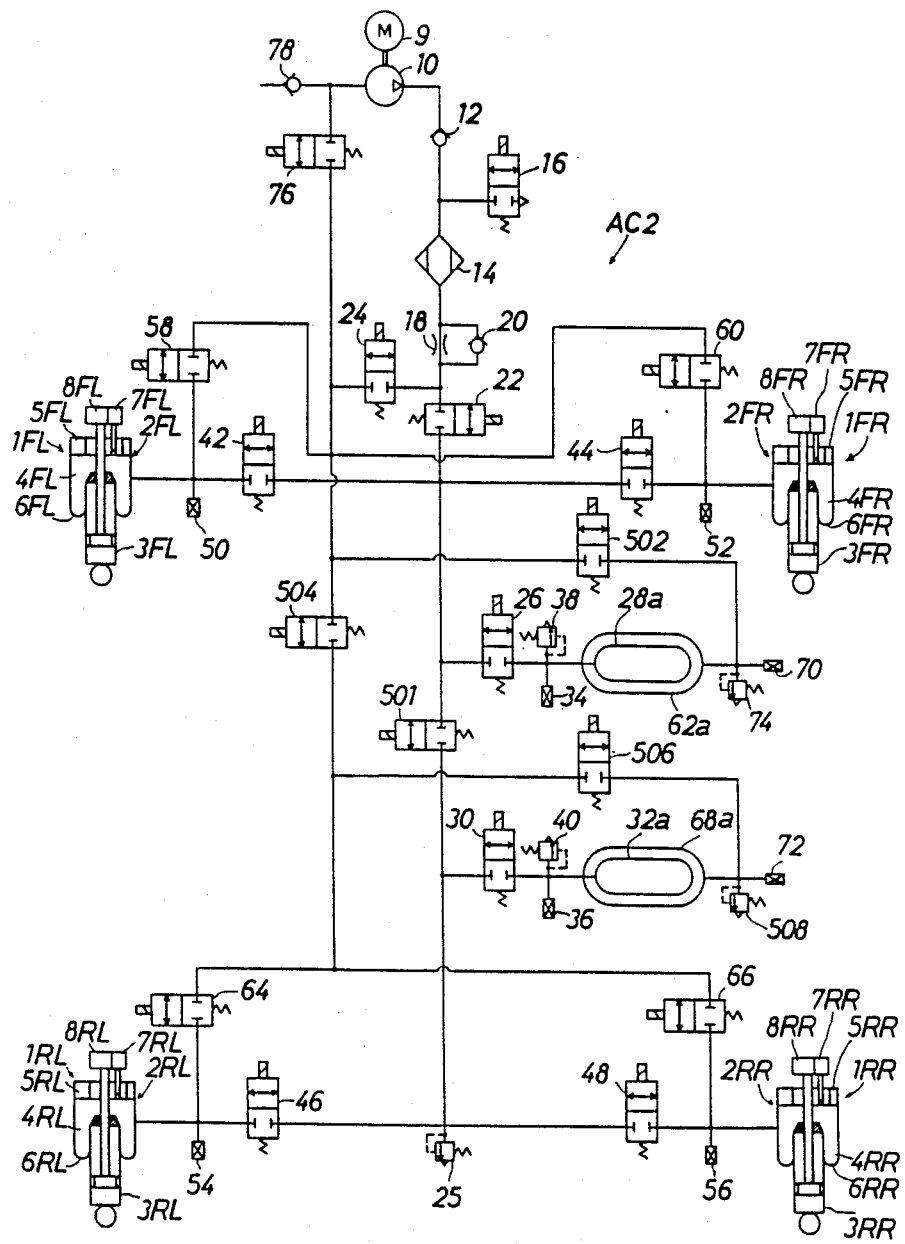
FIG. 15 is an air circuit diagram showing another embodiment of the present invention.

Set forth is the explanation of another embodiment different from that of with reference to FIG. 15. In this air circuit AC2, the same components as those of the air circuit AC are designated by the same reference numerals.

In the air circuit AC2, a high pressure reserve tank 28a and a low pressure reserve tank 62a at the front wheel side as well as a high pressure reserve tank 32a and a low pressure reserve tank 68a at the rear wheel side are made integral. One side of the high pressure reservoir valve 26 connected to the front-wheel side high pressure reserve tank 28a and the high pressure reservoir valve 30 connected to the rear-wheel side high pressure reserve tank 32a are connected to each other through a communication valve 501 for establishing and blocking the communication. As a result, even if the two high pressure reservoir valves 26 and 30 are simultaneously energized, no communication is established between the two high pressure reserve tanks 28a and 32a unless the communication valve 501 is energized.

Moreover, the front-wheel side low pressure reserve tank 62a is connected to one side of a low pressure reservoir valve 502 for establishing and blocking the communication, the other side of the valve 502 is connected to the suction valve 76 and the front-wheel side two discharge valves 58 and 60 and to one side of a communication valve 504 for establishing and blocking the communication. The other side of this communication valve 504 is connected to the low pressure reserve tank 68a through a low pressure reserve valve 506 for providing and blocking the communication and to the rear-wheel side two discharge valves 64 and 66. Furthermore, the low pressure reserve tank 68a is connected to a relief valve 508 which is set to operate at a predetermined pressure. As a result, the low pressure reserve tanks 62a and 68a have their communications blocked from other valves by the low pressure reservoir valves 502 and 506 so that they do not communicate with each other until the communication valve 504 is energized, even if the two low pressure reservoir valves 502 and 506 are energized.

This air circuit AC2 allows the main air chambers 4FL and 4FR and the low pressure reserve tank 62a to communicate with each other by energizing the low pressure reservoir valves 502 and the discharge valves 58 and 60 at the front wheel side. Moreover, the main air chambers 4RL and 4RR and the low pressure reserve tank 68a are enabled to communicate by energizing the low pressure reservoir valve 506 and the main air chambers 4RL and 4RR at the rear wheel side.

In the air circuit AC2, the communication valve 501 and the high pressure reservoir valves 26 and 30 act as the communication means in the high pressure side, and the communication valve 504 and the low-pressure reservoir valves 502 and 506 act as the communication means in the low pressure side. Besides, the pressure sensors 34, 36, 70 and 72 function as the air state detection means.

Figure 11:
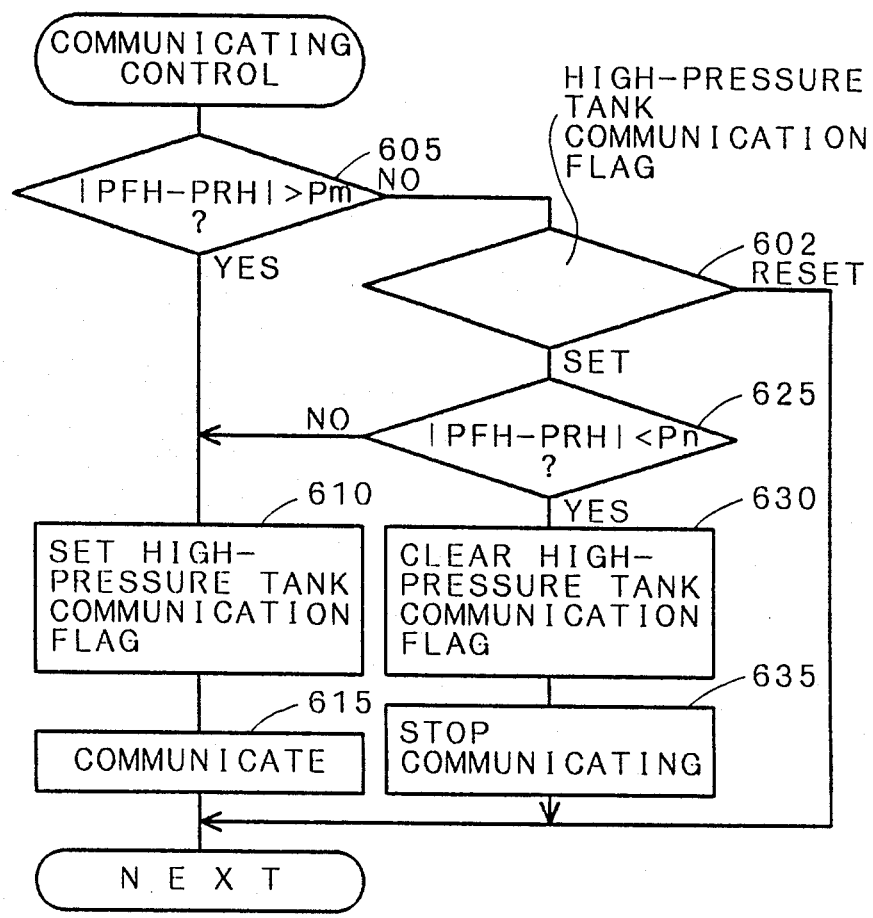
FIG. 11 is a flowchart of communicating control routine.

The high-pressure reserve tanks 28a and 32a are controlled to communicate by the communication means in accordance with the flowchart of FIG. 11, and also the communication is established between the low-pressure reserve tanks 62a and 68a by energizing the low-pressure reservoir valves 502 and 506 when the absolute value of the difference between the low-pressure reserve tank pressures PFL and PRL attains the predetermined maximum pressure difference Pm. AAs a result, the low-pressure reserve tank pressures PFL and PRL can be maintained to be almost equal, so that difference never occurs between the time period for supplying air from the front wheel side air springs 2FL and 2FR to the lowpressure reserve tanks 62a and the time period for supplying air from the rear wheel side air springs 2RL and 2RR to the low pressure reserve tanks 68a. Accordingly, the actions of the air springs 2FL, 2FR, 2RL and 2RR can be equalized.

Despite of the embodiments thus far described, the present invention should not be limited thereto but can naturally be practiced in various modes without departing from its scope.

What is claimed is:

1. A gas suspension system having a plurality of gas suspensions (M2) each provided for a wheel (M1) of a vehicle comprising;
a plurality of reserve tanks (M3) each communicably connected to at least one of the gas suspensions and all provided for effecting a same function against the gas suspensions, the function being either to supply gas to the gas suspensions or to receive gas from the gas suspensions;
communication means (M4) for making a communication among the plurality of reserve tanks effecting the same function;
a plurality of gas state detection means (M5) each provided for each of the plurality of reserve tanks for detecting a gas state of each of the plurality of reserve tanks; and
communication control means (M6) for effecting the communication means to make a communication among the plurality of reserve tanks effecting the same function when a difference among the detected gas states of the plurality of reserve tanks effecting the same function becomes a predetermined state.

2. The gas suspension system according to claim 1 wherein;

the gas state detected by the gas state detection means is a pressure of each of the plurality of reserve tanks; and the communication control means effects the communication means to make a communication among the plurality of reserve tanks effecting the same function when a maximum pressure difference among the detected pressures is greater than a predetermined value.

3. A gas suspension system having a plurality of gas suspensions each provided for a wheel of a vehicle and divided into two groups, the gas suspension system comprising;

two high pressure reserve tanks each communicably connected to each of the groups of the gas suspensions for supplying gas to the gas suspensions;

communication means for allowing communication between the two high pressure reserve tanks;

two gas state detection means each provided for each of the two high pressure reserve tanks fr detecting a gas pressure in each of the two high pressure reserve tanks; and communication control means for effecting the communication means to make a communication between the two high pressure reserve tanks when a difference between the detected gas pressures of the two high pressure reserve tanks exceeds a predetermined value.

4. A gas suspension system having a plurality of gas suspensions each provided for a wheel of a vehicle and divided into two groups, the gas suspension system comprising;

two low pressure reserve tanks each communicably connected to each of the groups of the gas suspensions for receiving gas from the gas suspensions;

communication means for allowing communication between the two low pressure reserve tanks;

two gas state detection means each provided for each of the two low pressure reserve tanks for detecting a gas pressure in each of the two low pressure reserve tanks; and communication control means for effecting the communication means to make a communication between the two low pressure reserve tanks when a difference between the detected gas pressures of the two low pressure reserve tanks exceeds a predetermined value.

* * * * *